United States Patent
Huang

(10) Patent No.: US 10,768,649 B2
(45) Date of Patent: Sep. 8, 2020

(54) DRIVING VOLTAGE ADJUSTMENT CIRCUIT AND ELECTRONIC APPARATUS HAVING THE SAME

(71) Applicant: PEGATRON CORPORATION, Taipei (TW)

(72) Inventor: Chao-Jui Huang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 0 days.

(21) Appl. No.: 16/162,145

(22) Filed: Oct. 16, 2018

(65) Prior Publication Data
US 2019/0146534 A1    May 16, 2019

(30) Foreign Application Priority Data
Nov. 16, 2017  (TW) .............................. 106139701 A

(51) Int. Cl.
| | | |
|---|---|---|
| *G05F 1/00* | (2006.01) | |
| *G05F 1/575* | (2006.01) | |
| *H05B 45/37* | (2020.01) | |
| *H02P 7/29* | (2016.01) | |

(52) U.S. Cl.
CPC .............. *G05F 1/575* (2013.01); *H05B 45/37* (2020.01); *H02P 7/29* (2013.01)

(58) Field of Classification Search
CPC ........ G05F 1/575; H02P 7/29; H05B 33/0818
See application file for complete search history.

(56) References Cited

U.S. PATENT DOCUMENTS

| | | | | |
|---|---|---|---|---|
| 3,073,970 A | * | 1/1963 | Bright | .................... H03K 19/09 |
| | | | | 326/124 |
| 3,500,067 A | * | 3/1970 | Davis | ....................... H03K 5/12 |
| | | | | 327/323 |
| 2012/0201284 A1 | | 8/2012 | Kojima | |
| 2017/0255214 A1 | * | 9/2017 | Ho | ............................ G05F 1/56 |

FOREIGN PATENT DOCUMENTS

| | | |
|---|---|---|
| CN | 103573666 | 2/2014 |
| TW | 588884 | 5/2004 |

* cited by examiner

*Primary Examiner* — Adolf D Berhane
*Assistant Examiner* — Afework S Demisse
(74) *Attorney, Agent, or Firm* — J.C. Patents

(57) ABSTRACT

A driving circuit and an electronic apparatus having the same are provided. The electronic apparatus includes a load circuit and the driving circuit. The driving circuit is coupled to the load circuit. The driving circuit includes a voltage-divider circuit and a converting circuit. The voltage-divider circuit is configured to receive N control signals and divides voltages of the N control signals to generate a first voltage, wherein N is an integer greater than or equal to two. The converting circuit is coupled to the voltage-divider circuit to receive the first voltage, converts the first voltage into a driving voltage, and drives the load circuit according to the driving voltage.

9 Claims, 2 Drawing Sheets

DRIVING VOLTAGE ADJUSTMENT CIRCUIT AND ELECTRONIC APPARATUS HAVING THE SAME

CROSS-REFERENCE TO RELATED APPLICATION

This application claims the priority benefit of Taiwan application serial no. 106139701, filed on Nov. 16, 2017. The entirety of the above-mentioned patent application is hereby incorporated by reference herein and made a part of this specification.

BACKGROUND

Technical Field

The present disclosure relates to a driving circuit. More particularly, the present disclosure relates to a driving circuit capable of dividing voltages of a plurality of control signals to generate different driving voltage values and an electronic apparatus having the same.

Description of Related Art

In the existing driving technology, the pulse width modulation (PWM) control technology is adopted most of the time to control a power switch component in a driving circuit of an electronic apparatus. In this way, the power switch component can provide a driving signal (e.g., a voltage) to control operations of a load circuit in the electronic apparatus, in which the load circuit may be, for example, a DC fan motor or a light emitting diode (LED) and the like. Generally, through adjusting the duty cycle of a PWM signal, a designer can enable the driving circuit to adjust the voltage value of the driving signal in response to the adjustment made to the PWM signal, so as to adjust rotating speed of the DC fan motor or brightness or color of the LED.

Nevertheless, under the consideration of hardware costs, PWM signal generators are not installed in some electronic apparatuses, such that the PWM signals can not be provided to the driving circuits.

SUMMARY

In view of the above, the present disclosure provides a driving circuit and an electronic apparatus having the same which can change voltages of a plurality of control signals and divide the voltages of the control signals to generate a driving voltage of different voltage values to control operation of a load circuit.

In an embodiment of the disclosure, a driving circuit is configured to drive a load circuit in an electronic apparatus. The driving circuit includes a voltage-divider circuit and a converting circuit. The voltage-divider circuit is configured to receive N control signals and divides voltages of the N control signals to generate a first voltage, wherein N is an integer greater than or equal to two. The converting circuit is coupled to the voltage-divider circuit to receive the first voltage, converts the first voltage into a driving voltage, and drives the load circuit according to the driving voltage.

In an embodiment of the disclosure, the voltage of each of the N control signals includes a logic high electric potential, a logic low electric potential, and a high impedance electric potential.

In an embodiment of the disclosure, the voltage-divider circuit divides the voltages of the N control signals to generate the first voltage of at most $3^N$ different voltage values such that the converting circuit correspondingly generates the driving voltage of at most $3^N$ different voltage values.

In an embodiment of the disclosure, an electronic apparatus includes a load circuit and a driving circuit. The driving circuit is coupled to the load circuit. The driving circuit includes a voltage-divider circuit and a converting circuit. The voltage-divider circuit is configured to receive N control signals and divides voltages of the N control signals to generate a first voltage, wherein N is an integer greater than or equal to two. The converting circuit is coupled to the voltage-divider circuit to receive the first voltage, converts the first voltage into a driving voltage, and drives the load circuit according to the driving voltage.

To sum up, in the driving circuit and the electronic apparatus having the same provided by the embodiments of the disclosure, the voltages of the control signals may be divided so as to generate the corresponding driving voltage to control the operation of the load circuit.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
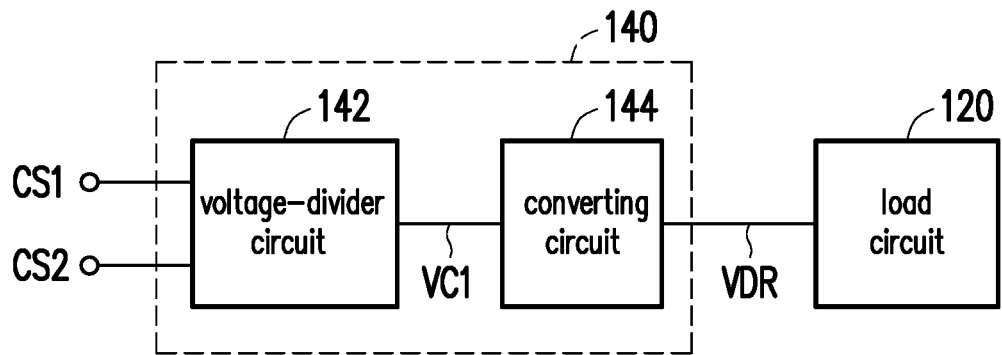
FIG. 1 illustrates a schematic circuit block diagram of an electronic apparatus according to an embodiment of the present disclosure.

In order to make the disclosure more comprehensible, several embodiments are described below as examples of implementation of the disclosure. In addition, wherever possible, identical or similar reference numerals stand for identical or similar elements/components in the drawings and the embodiments.

With reference to FIG. 1, FIG. 1 illustrates a schematic circuit block diagram of an electronic apparatus according to an embodiment of the present disclosure. In an embodiment of the present disclosure, an electronic apparatus 100 may be, for example, a DC fan apparatus, a light emitting diode display apparatus, a light emitting diode lamp, or a power supply apparatus and the like. Nevertheless, the present disclosure is not limited thereto. The electronic apparatus 100 may include a load circuit 120 and a driving circuit 140. In an embodiment of the present disclosure, the load circuit 120 may be, for example, a DC fan motor, a light emitting diode module, or any load with input voltage adjustment requirement. Nevertheless, the present disclosure is not limited thereto.

The driving circuit 140 is coupled to the load circuit 120. The driving circuit 140 may include a voltage-divider circuit 142 and a converting circuit 144. The voltage-divider circuit 142 is configured to receive N control signals and divides voltages of the N control signals to generate a first voltage VC1, in which N is an integer greater than or equal to two. For the sake of convenience and conciseness, the number N of the control signal is set to be two in the following embodiments for illustration. However embodiments with the number of the control signals equals to three or greater than three may be derived from the following description. Hence, as shown in FIG. 1, the voltage-divider circuit 142 receives a control signal CS1 and a control signal CS2 and divides voltages of the control signal CS1 and the control signal CS2 to generate the first voltage VC1.

The converting circuit 144 is coupled to the voltage-divider circuit 142 to receive the first voltage VC1. The converting circuit 144 may convert the first voltage VC1 into a driving voltage VDR meeting specifications of the load circuit 120 and may drive the load circuit 120 according to the driving voltage VDR.

In an embodiment of the present disclosure, the voltage of the control signal CS1 may be a logic high electric potential, a logic low electric potential, or a high impedance electric potential. Moreover, the voltage of the control signal CS1 may be switched among the three electric potentials according to operation requirements of the load circuit 120, such that the first voltage VC1 and the driving voltage VDR can be adjusted. Similarly, the voltage of the control signal CS2 may be a logic high electric potential, a logic low electric potential, or a high impedance electric potential. Moreover, the voltage of the control signal CS2 may be switched among the three electric potentials according to the operation requirements of the load circuit 120, such that the first voltage VC1 and the driving voltage VDR can be adjusted. It should be understood that even though the electronic apparatus 100 is unable to provide a pulse width modulation (PWM) signal to control the operation of the load circuit 120, the driving voltage VDR can still be adjusted and the operation of the load circuit 120 can still be controlled accordingly by changing the voltage of at least one of the control signal CS1 and the control signal CS2.

For instance, if the load circuit 120 is a DC fan motor, a rotating speed of the DC fan motor can be changed by changing the voltage of at least one of the control signal CS1 and the control signal CS2. Alternatively, if the load circuit 120 is a light emitting diode module, brightness or a color of the light emitting diode module can be changed by changing the voltage of at least one of the control signal CS1 and the control signal CS2.

Figure 2:
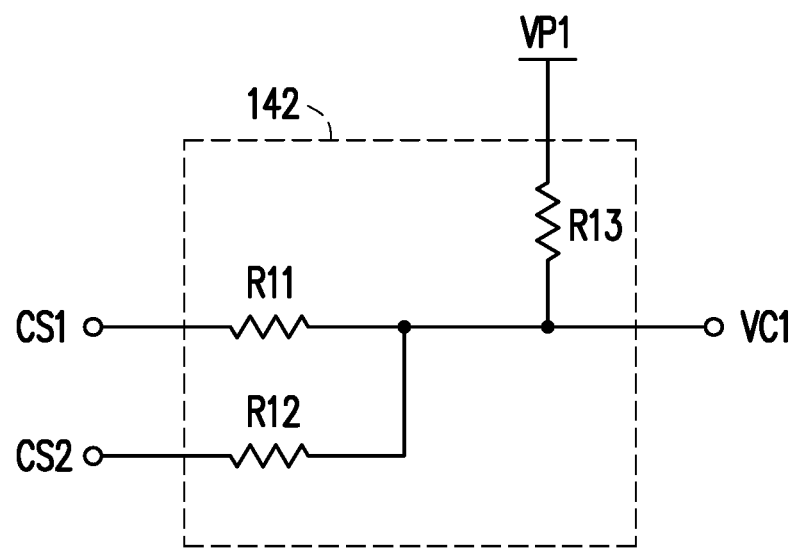
FIG. 2 is a schematic diagram illustrating a circuit structure of a voltage-divider circuit according to an embodiment of the present disclosure.
Figure 3:
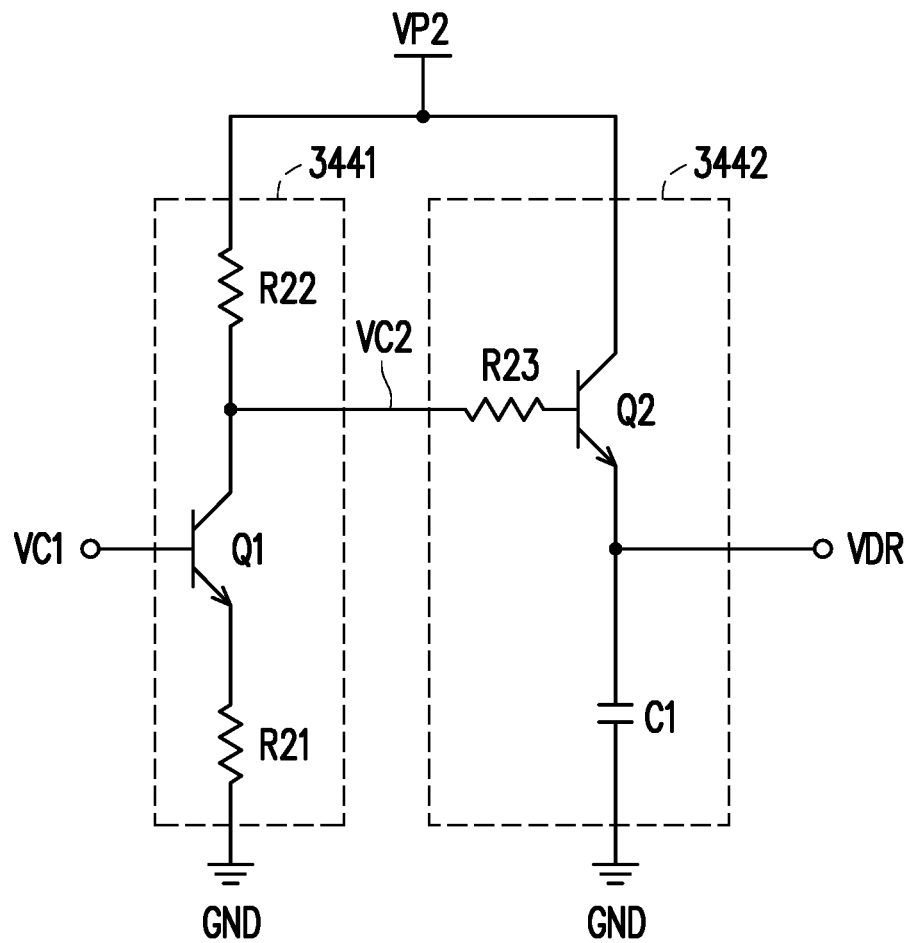
FIG. 3 is a schematic diagram illustrating a circuit structure of a converting circuit according to an embodiment of the present disclosure.

With reference to FIG. 1, FIG. 2, and FIG. 3 together, FIG. 2 is a schematic diagram illustrating a circuit structure of a voltage-divider circuit according to an embodiment of the present disclosure, and FIG. 3 is schematic diagram illustrating a circuit structure of a converting circuit according to an embodiment of the present disclosure. As shown in FIG. 2, the voltage-divider circuit 142 may include a bias resistor R13, a voltage-divider resistor R11, and a voltage-divider resistor R12. A first terminal of the bias resistor R13 is coupled to a first power source VP1. A first terminal of the voltage-divider resistor R11 is configured to receive the control signal CS1, and a first terminal of the voltage-divider resistor R12 is configured to receive the control signal CS2. A second terminal of the voltage-divider resistor R11, a second terminal of the voltage-divider resistor R12, and a second terminal of the bias resistor R13 are coupled to one another to generate the first voltage VC1.

As shown in FIG. 3, the converting circuit 144 may include a first stage circuit 3441 and a second stage circuit 3442. The first stage circuit 3441 is configured to receive the first voltage VC1 and generate a second voltage VC2 accordingly, in which a voltage value of the first voltage VC1 and a voltage value of the second voltage VC2 are inverted. That is, when the voltage value of the first voltage VC1 increases, the voltage value of the second voltage VC2 decreases, and vice versa. The second stage circuit 3442 is coupled to the first stage circuit 3441 to receive the second voltage VC2 and generate the driving voltage VDR accordingly, in which a voltage value of the driving voltage VDR and the voltage value of the second voltage VC2 are non-inverted. That is, when the voltage value of the second voltage VC2 increases, the voltage value of the driving voltage VDR increases, and vice versa.

Further, the first stage circuit 3441 may include a first transistor Q1, a first resistor R21, and a second resistor R22. A control terminal of the first transistor Q1 is configured to receive the first voltage VC1. A first terminal of the first transistor Q1 is configured to generate the second voltage VC2. The first resistor R21 is coupled between a second terminal of the first transistor Q1 and a ground power source GND. The second resistor R22 is coupled between a second power source VP2 and the first terminal of the first transistor Q1. The second stage circuit 3442 may include a third resistor R23, a second transistor Q2, and a capacitor C1. A first terminal of the third resistor R23 is configured to receive the second voltage VC2. A control terminal of the second transistor Q2 is coupled to a second terminal of the third resistor R23. A first terminal of the second transistor Q2 is coupled to the second power source VP2. A second terminal of the second transistor Q2 is coupled to a first terminal of the capacitor C1 to generate the driving voltage VDR. A second terminal of the capacitor C1 is coupled to a ground power source GND.

It should be understood that, the first stage circuit 3441 can convert the first voltage VC1 in a power domain of the first power source VP1 into the second voltage VC2 in a power domain of the second power source VP2 to meet electrical specifications of the driving circuit 120. In addition, a driving capability and a voltage stability of the driving voltage VDR can be enhanced by the second stage circuit 3442.

In an embodiment of the present disclosure, the first transistor Q1 and the second transistor Q2 may be realized by bipolar junction transistors (BJTs), but the present disclosure is not limited thereto. In other embodiments of the present disclosure, the first transistor Q1 and the second transistor Q2 may also be realized by metal-oxide-semiconductor field-effect transistors (MOSFETs). Further, in an embodiment of the present disclosure, the converting circuit 144 may also be realized by a power source converting circuit of other type. A structure of the converting circuit 144 is not limited by the present disclosure.

In terms of operation, based on the voltage of the control signal CS1 may be a logic high electric potential, a logic low electric potential, or a high impedance electric potential, and the voltage of the control signal CS2 may be a logic high electric potential, a logic low electric potential, or a high impedance electric potential, there are nine (i.e., $3^2=9$) possible arrangements in total of the voltage of the control signal CS1 and the voltage of the control signal CS2, as shown in Table 1. Moreover, each of voltage values VDR1 to VDR9 of the driving voltage VDR corresponding to each of the possible arrangements as shown in Table 1 may be designed through the voltage-divider circuit 142 in FIG. 2 and the converting circuit 144 in FIG. 3. In Table 1, "High" refers to the logic high electric potential, "Low" refers to the logic low electric potential, and "Hi-Z" refers to the high impedance electric potential. Besides, the voltage values VDR1 to VDR9 of the driving voltage VDR in Table 1 are simulation experiment results obtained by the voltage-divider circuit 142 in FIG. 2 and the converting circuit 144 in FIG. 3 under specific specifications. Therefore, a designer can select at least part of the possible arrangements to serve as the basis to control the operation of the load circuit 120 according to actual application requirements.

TABLE 1

| voltage of control signal CS1 | voltage of control signal CS2 | driving voltage VDR |
|---|---|---|
| High | High | VDR1 (1.9 V) |
| High | Hi-Z | VDR2 (1.9 V) |
| Hi-Z | High | VDR3 (1.9 V) |
| Hi-Z | Hi-Z | VDR4 (5.1 V) |
| Low | High | VDR5 (5.8 V) |
| High | Low | VDR6 (6.8 V) |
| Low | Hi-Z | VDR7 (10.4 V) |
| Hi-Z | Low | VDR8 (11 V) |
| Low | Low | VDR9 (11.9 V) |

It should be understood that, if the number of the control signals is N, the N control signals is divided by the bias resistor and N voltage-divider resistors in the voltage-divider circuit to generate the first voltage of at most $3^N$ different voltage values, and the converting circuit may generate the driving voltage of at most $3^N$ different voltage values correspondingly. In other words, N control signals may be designed to $3^N$ possible arrangements and the driving voltage corresponding to each of the possible arrangements, and the designer can select at least part of the possible arrangements among the $3^N$ possible arrangements to serve as the basis to control the operation of the load circuit according to actual application requirements.

In view of the foregoing, the driving circuit and the electronic apparatus having the same provided by the embodiments of the present disclosure may switch the voltages of the control signals among the logic high electric potential, the logic low electric potential, and the high impedance electric potential. Further, the voltages of these control signals may be divided, so as to generate the driving voltage of various different voltage values to control the operation of the load circuit. Therefore, when the electronic apparatus is unable to provide the PWM signal to control the operation of the driving circuit, the driving voltage can still be adjusted correspondingly to control the operation of the load circuit by changing the voltage of at least one of the control signals.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A driving circuit, configured to drive a load circuit in an electronic apparatus, the driving circuit comprising:
   a voltage-divider circuit, configured to receive N control signals and divide voltages of the N control signals to generate a first voltage, wherein N is an integer greater than or equal to two; and
   a converting circuit, coupled to the voltage-divider circuit to receive the first voltage, converting the first voltage into a driving voltage, and driving the load circuit according to the driving voltage,
   wherein the converting circuit comprises:
   a first stage circuit, configured to receive the first voltage and generate a second voltage accordingly, wherein a voltage value of the first voltage and a voltage value of the second voltage are inverted; and
   a second stage circuit, coupled to the first stage circuit to receive the second voltage and generate the driving voltage accordingly, wherein a voltage value of the driving voltage and the voltage value of the second voltage are non-inverted.

2. The driving circuit as claimed in claim 1, wherein the voltage of each of the N control signals comprises a logic high electric potential, a logic low electric potential, and a high impedance electric potential.

3. The driving circuit as claimed in claim 2, wherein the voltage-divider circuit divides the voltages of the N control signals to generate the first voltage of at most 3N different voltage values such that the converting circuit correspondingly generates the driving voltage of at most 3N different voltage values.

4. The driving circuit as claimed in claim 1, wherein the voltage-divider circuit comprises:
   a bias resistor, a first terminal of the bias resistor coupled to a first power source; and
   N voltage-divider resistors, a first terminal of each of the N voltage-divider resistors configured to receive one of the N control signals, and a second terminal of each of the N voltage-divider resistors coupled to a second terminal of the bias resistor to generate the first voltage.

5. The driving circuit as claimed in claim 1, wherein:
   the first stage circuit comprises:
   a first transistor, a control terminal of the first transistor configured to receive the first voltage, a first terminal of the first transistor configured to generate the second voltage;
   a first resistor, coupled between a second terminal of the first transistor and a ground power source; and
   a second resistor, coupled between a second power source and the first terminal of the first transistor,
   wherein the second stage circuit comprises:
   a third resistor, a first terminal of the third resistor configured to receive the second voltage;
   a second transistor, a control terminal of the second transistor coupled to a second terminal of the third resistor, a first terminal of the second transistor coupled to the second power source; and
   a capacitor, a first terminal of the capacitor coupled to a second terminal of the second transistor to generate the driving voltage, a second terminal of the capacitor coupled to the ground power source.

6. An electronic apparatus, comprising:
   a load circuit; and
   a driving circuit, coupled to the load circuit, wherein the driving circuit comprises:
   a voltage-divider circuit, configured to receive N control signals and divide voltages of the N control signals to generate a first voltage, wherein N is an integer greater than or equal to two; and
   a converting circuit, coupled to the voltage-divider circuit to receive the first voltage, converting the first voltage into a driving voltage, and driving the load circuit according to the driving voltage,
   wherein the converting circuit comprises:

a first stage circuit, configured to receive the first voltage and generate a second voltage accordingly, wherein a voltage value of the first voltage and a voltage value of the second voltage are inverted; and a second stage circuit, coupled to the first stage circuit to receive the second voltage and generate the driving voltage accordingly, wherein a voltage value of the driving voltage and the voltage value of the second voltage are non-inverted.

7. The electronic apparatus as claimed in claim 6, wherein the voltage of each of the N control signals comprises a logic high electric potential, a logic low electric potential, and a high impedance electric potential.

8. The electronic apparatus as claimed in claim 7, wherein the voltage-divider circuit divides the voltages of the N control signals to generate the first voltage of at most 3N different voltage values such that the converting circuit correspondingly generates the driving voltage of at most 3N different voltage values.

9. The electronic apparatus as claimed in claim 6, wherein the voltage-divider circuit comprises:

a bias resistor, a first terminal of the bias resistor coupled to a first power source; and N voltage-divider resistors, a first terminal of each of the N voltage-divider resistors configured to receive one of the N control signals, and a second terminal of each of the N voltage-divider resistors coupled to a second terminal of the bias resistor to generate the first voltage.

* * * * *